(12) United States Patent
Jung et al.

(10) Patent No.: US 8,682,299 B2
(45) Date of Patent: *Mar. 25, 2014

(54) METHOD AND APPARATUS FOR SUPPORTING CSG SERVICE IN WIRELESS COMMUNICATION SYSTEM

(75) Inventors: SungHoon Jung, Seoul (KR); SungDuck Chun, Seoul (KR); Seungjune Yi, Seoul (KR); Young Dae Lee, Seoul (KR); Sung Jun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 338 days.

This patent is subject to a terminal disclaimer.

(21) Appl. No.: 12/697,455

(22) Filed: Feb. 1, 2010

(65) Prior Publication Data

US 2010/0197277 A1 Aug. 5, 2010

Related U.S. Application Data

(60) Provisional application No. 61/149,007, filed on Feb. 1, 2009.

(30) Foreign Application Priority Data

Jan. 29, 2010 (KR) ........................ 10-2010-0008373

(51) Int. Cl.
*H04M 3/42* (2006.01)
(52) U.S. Cl.
USPC .................... 455/414.1; 455/434; 455/435.1; 455/552.1; 455/550.1; 455/456.5

(58) Field of Classification Search
USPC ............. 455/414.1, 434, 435.1, 552.1, 550.1, 455/456.5, 519
See application file for complete search history.

(56) References Cited

U.S. PATENT DOCUMENTS 8,310,946 B2 * 11/2012 Somasundaram et al. .... 370/252
8,433,317 B2 * 4/2013 Wu ............................... 455/434

(Continued)

FOREIGN PATENT DOCUMENTS

CN 101272336 9/2008
EA 010985 4/2008

(Continued)

OTHER PUBLICATIONS

Russian Federation for Intellectual Property Application Serial No. 2011136355/08, Notice of Allowance dated Oct. 26, 2012, 14 pages.

(Continued)

*Primary Examiner* — Khai M Nguyen
(74) *Attorney, Agent, or Firm* — Lee, Hong, Degerman, Kang & Waimey

(57) ABSTRACT

A method and apparatus for supporting a closed subscriber group (CSG) service is provided. The apparatus includes a memory configured to store CSG subscription information, and a processor operatively coupled to the RF unit and the memory and to implement a radio interface protocol. The processor is configured to access to a base station (BS), transmit the CSG subscription information to the BS, receive an access mode from the BS, wherein the access mode is determined based on the CSG subscription information, and negotiate with the BS on a CSG service if the access mode supports a CSG to which the apparatus belongs.

8 Claims, 11 Drawing Sheets

(56) References Cited

U.S. PATENT DOCUMENTS

| | | | |
|---|---|---|---|
| 8,442,571 B2 * | 5/2013 | Jung et al. | 455/518 |
| 2004/0146021 A1 | 7/2004 | Fors et al. | |
| 2008/0076393 A1 | 3/2008 | Khetawat et al. | |
| 2008/0261596 A1 | 10/2008 | Khetawat et al. | |
| 2008/0267153 A1 | 10/2008 | Mukherjee et al. | |
| 2010/0110945 A1 * | 5/2010 | Koskela et al. | 370/310 |
| 2010/0112981 A1 * | 5/2010 | Suh et al. | 455/411 |
| 2010/0124179 A1 * | 5/2010 | Lee et al. | 370/252 |
| 2011/0269460 A1 * | 11/2011 | Dalsgaard et al. | 455/435.1 |
| 2012/0028639 A1 * | 2/2012 | Jeong et al. | 455/434 |

FOREIGN PATENT DOCUMENTS

| | | |
|---|---|---|
| EP | 1947889 | 7/2008 |
| EP | 1947889 A2 * | 7/2008 |
| KR | 1020050098372 | 10/2005 |
| KR | 1020080086413 | 9/2008 |
| RU | 2269873 | 8/2004 |

OTHER PUBLICATIONS

The State Intellectual Property Office of the People's Republic of China Application Serial No. 201080009217.9, Office Action dated Jul. 25, 2013, 6 pages.

Samsung, "Configuration of PDCCH Monitoring Set," 3GPP TSG RAN WG1 Meeting #51bis, R1-080028, Jan. 2008, 3 pages.

LG Electronics Inc., "Cell/UE Bandwidth Scenarios for LTE," 3GPP TSG-RAN WG2 #51, R2-060578, Feb. 2006, 4 pages.

Motorola, "UE Capability," 3GPP TSG RAN1 #50, R1-073365, Aug. 2007, 6 pages.

Japan Patent Office Application Serial No. 2012-189838, Office Action dated Jul. 25, 2013, 3 pages.

* cited by examiner

METHOD AND APPARATUS FOR SUPPORTING CSG SERVICE IN WIRELESS COMMUNICATION SYSTEM

CROSS-REFERENCE TO RELATED APPLICATIONS

This application claims the benefit of priority of U.S. Provisional application 61/149,007, filed on Feb. 1, 2009, and pursuant to 35 U.S.C. §119(a), this application claims the benefit of earlier filing date and right of priority to Korean Patent Application No. 10-2010-0008373, filed on Jan. 29, 2010, the contents of all of which are incorporated by reference herein in their entirety entireties.

BACKGROUND OF THE INVENTION

1. Field of the invention

The present invention relates to wireless communications, and more particularly, to a method and apparatus for supporting a closed subscriber group (CSG) service in a wireless communication system.

2. Related Art

The Third Generation Partnership Project (3GPP) Long Term Evolution (3GPP LTE) which is a set of enhancements to the Universal Mobile Telecommunications System (UMTS) is introduced as 3GPP Release 8. The 3GPP LTE uses orthogonal frequency division multiple access (OFDMA) for the downlink, and single carrier frequency division multiple access (SC-FDMA) for the uplink, and adopts multiple input multiple output (MIMO) with up to 4 antennas. Research is now underway on 3GPP LTE-Advanced (LTE-A), which is a major enhancement to 3GPP LTE.

Closed subscriber group (CSG) services, which are services that can be provided only to a certain group of subscribers, have been introduced to improve quality of service. A base station (BS) capable of providing CSG services is referred to as a Home eNodeB (HNB), and a cell serving CSG members is referred to as a CSG cell. The basic requirements regarding CSG services are as disclosed in 3GPP TS 22.220 V1.0.1 (2008-12) "Service requirements for Home NodeBs and Home eNodeBs (Release 9)".

Given that most CSG services are provided at higher costs than other typical wireless communication services, it is important to guarantee the quality of CSG services.

There is a need for a method and apparatus to improve the quality of CSG services.

SUMMARY OF THE INVENTION

The present invention provides a method and apparatus for supporting a closed subscriber group (CSG) service in a wireless communication system.

The present invention also provides a method and apparatus for providing CSG subscription information in a wireless communication system.

The present invention also provides a method and apparatus for determining an access mode based on CSG subscription information in a wireless communication system.

In an aspect, a wireless apparatus for supporting a closed subscriber group (CSG) service in a wireless communication system is provided. The apparatus includes a radio frequency unit to transmit and receive radio signals, a memory configured to store CSG subscription information, and a processor operatively coupled to the RF unit and the memory and to implement a radio interface protocol, wherein the processor is configured to access to a base station (BS), transmit the CSG subscription information to the BS, receive an access mode from the BS, wherein the access mode is determined based on the CSG subscription information, and negotiate with the BS on a CSG service if the access mode supports a CSG to which the apparatus belongs.

The processor may be configured to transmit the CSG subscription information to the BS if a request for the transfer of the CSG subscription information is received from the BS.

The request for the transfer of the CSG subscription information may be broadcast by the BS.

The CSG subscription information may include at least one of a CSG whitelist, a CSG ID of a target BS and CSG membership information indicating whether a user equipment (UE) is CSG member UE of the target BS.

The processor may be configured to transmit the CSG subscription information to the BS if there is an update in the content of the CSG subscription information.

The access mode may be one of a closed access mode, an open access mode and a hybrid mode.

The access mode may be received via system information.

The system information may include a CSG indicator indicating whether a cell of the BS is a CSG cell and a CSG identity indicating an identifier of a CSG supported, and the access mode may be represented by a combination of the CSG indicator and the CSG identity.

In another aspect, a method of supporting a CSG service in a wireless communication system is provided. The method includes accessing to a base station (BS) at a user equipment (UE), transmitting CSG subscription information to the BS, receiving an access mode from the BS, wherein the access mode is determined based on the CSG subscription information, and negotiating with the BS on a CSG service if the access mode supports a CSG to which the UE belongs.

In still another aspect, a base station for supporting a CSG service in a wireless communication system is provided. The base station includes a radio frequency unit to transmit and receive radio signals, and a processor operatively coupled to the RF unit and the memory and to implement a radio interface protocol, wherein the processor is configured to receive CSG subscription information from each UE in a cell, determine an access mode based on the CSG subscription information, and transmit the access mode to each UE in the cell.

A BS may determine its access mode based on CSG subscription information provided by a UE. For example, if a number of UE currently being connected to the BS are members of a predetermined CSG, the BS may decide to switch its access mode from, for example, an open access mode, to a hybrid mode for supporting the predetermined CSG and may thus be able to provide high-quality CSG services to the members of the predetermined CSG.

The BS may determine the access mode or handover based on CSG subscription information provided by UE. Thus, it is possible for UE to have more opportunities to access to a BS capable of providing CSG services and to be provided with better CSG services.

DESCRIPTION OF EXEMPLARY EMBODIMENTS

Figure 1:
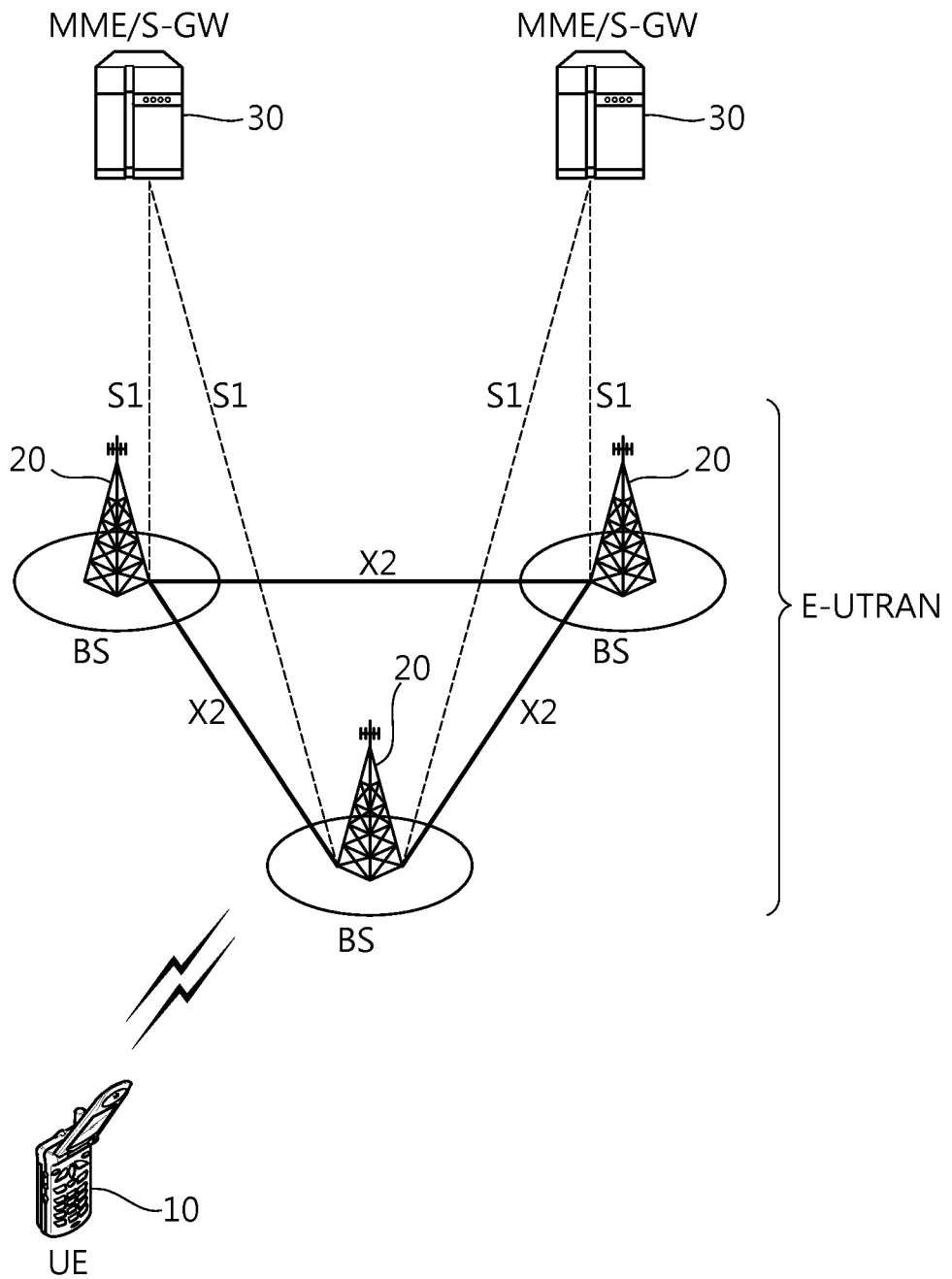
FIG. 1 is a view illustrating a mobile communication system to which the present invention are applied.

FIG. 1 is a view illustrating a mobile communication system to which the present invention are applied. This system may be also referred to as an Evolved-UMTS Terrestrial Radio Access Network (E-UTRAN) or a Long Term Evolution (LTE)/LTE-advanced (LTE-A) system.

The E-UTRAN includes at least one base station (BS) 20 providing a user plane and a control plane towards a user equipment (UE) 10. The UE can be fixed or mobile and can be referred to as another terminology, such as a MS (Mobile Station), a UT (User Terminal), a SS (Subscriber Station), MT(mobile terminal), a wireless device, or the like. The BS 20 may be a fixed station that communicates with the UE 10 and can be referred to as another terminology, such as an e-NB (evolved-NodeB), a BTS (Base Transceiver System), an access point, or the like.

The BSs 20 are interconnected with each other by means of an X2 interface. The BSs 20 are also connected by means of the 51 interface to the EPC (Evolved Packet Core) 30, more specifically to the Mobility Management Entity (MME) by means of the S1-MME and to the Serving Gateway (S-GW) by means of the S1-U.

The EPC 30 may include the MME, the S-GW, and a Packet Data Network-Gateway (P-GW). The MME has information on the connection of UE or the capability of UE, and such information is primarily used for the mobility management of the UE. The S-GW is a gateway having E-UTRAN as an end point, and the P-GW is a gateway having PDN as an end point.

The radio interface protocol layers between UE and a network can be divided into a first layer (L1), a second layer (L2) and a third layer (L3) based on three lower layers of an Open System Interconnection (OSI) reference model widely known in communications systems. A physical layer belonging to the first layer provides information transfer services using a physical channel, and a radio resource control (RRC) layer located at the third layer plays a role of controlling radio resources between UE and a network. For the purpose of this, the RRC layer exchanges RRC messages between UE and a network.

Figure 2:
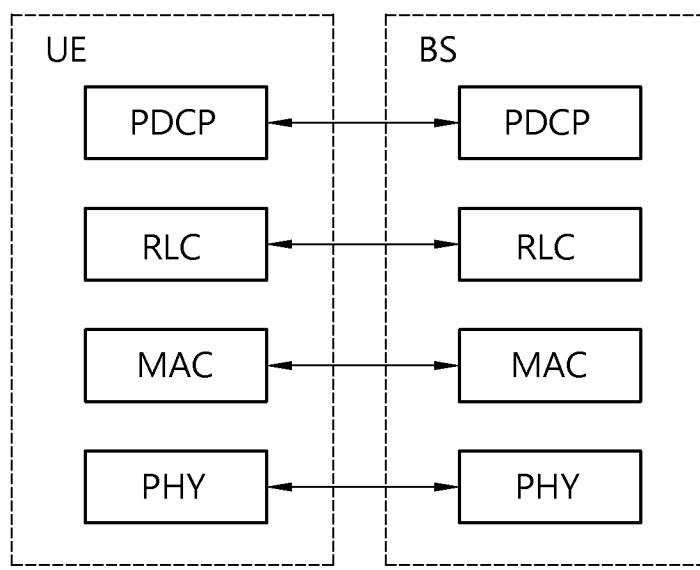
FIG. 2 is a block diagram showing radio protocol architecture for a user plane.
Figure 3:
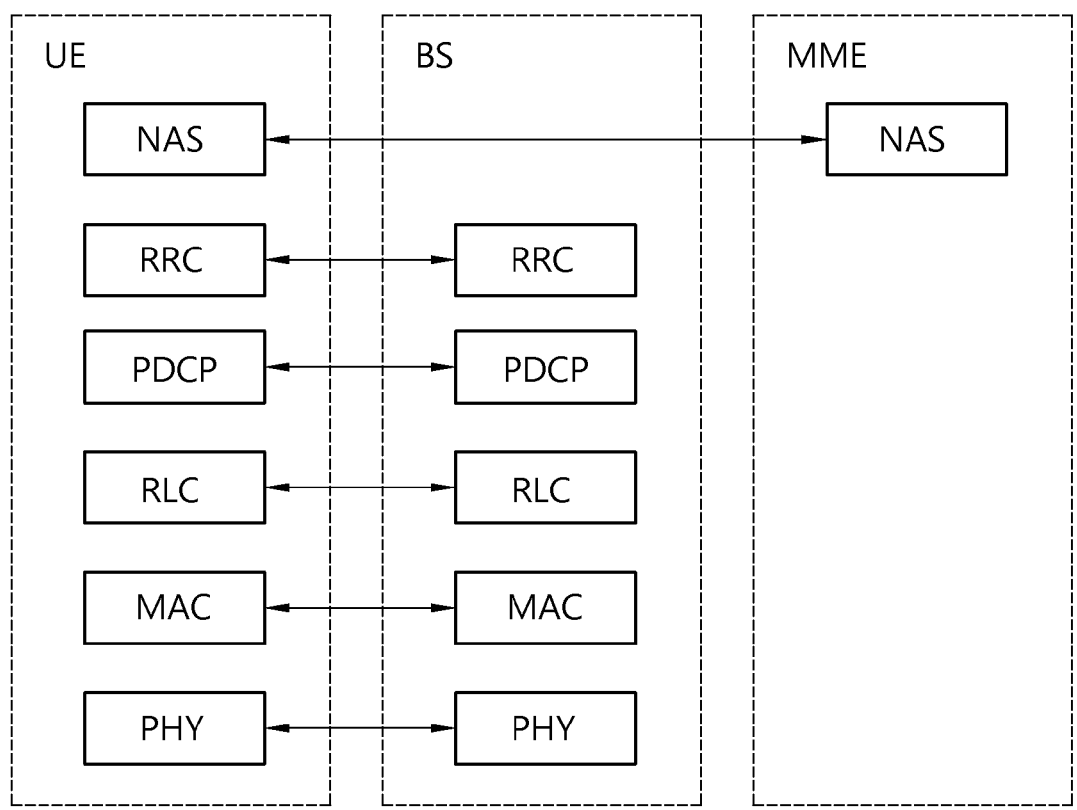
FIG. 3 is a block diagram showing radio protocol architecture for a control plane.

FIG. 2 is a block diagram showing radio protocol architecture for a user plane. FIG. 3 is a block diagram showing radio protocol architecture for a control plane. The data plane is a protocol stack for user data transmission and the control plane is a protocol stack for control signal transmission.

Referring to FIGS. 2 and 3, a physical (PHY) layer provides information transfer services to upper layers on a physical channel. The PHY layer is coupled with a MAC (Medium Access Control) layer, i.e., an upper layer of the PHY layer, through transport channels. Data is transferred between the MAC layer and the PHY layer through the transport channel. The transport channels are classified by how and with what characteristics data are transferred over the radio interface.

Between different physical layers, i.e., the physical layer of a transmitter and the physical layer of a receiver, data are transferred through the physical channel. The physical channel may be modulated by an Orthogonal Frequency Division Multiplexing (OFDM) scheme, and time and frequency are used as radio resources for the physical channel.

The functions of the MAC layer include mapping between logical channels and transport channels, and multiplexing/demultiplexing of MAC SDUs (Service Data Units) belonging to one or different logical channels into/from transport blocks (TBs) delivered to/from the PHY layer on transport channels. The MAC layer provides services to a RLC (Radio Link Control) layer through logical channels.

The functions of the RLC layer include concatenation, segmentation and reassembly of RLC SDUs. In order to guarantee various quality of services (QoSs) required by radio bearers (RBs), the RLC layer provides three operating modes: TM (Transparent Mode), UM (Unacknowledged Mode) and AM (Acknowledged Mode). The AM RLC provides error correction through automatic repeat request (ARQ).

The functions of a Packet Data Convergence Protocol (PDCP) layer for the user plane include transfer of user data, header compression/decompression and ciphering/deciphering. The functions of the PDCP layer for the control plane include transfer of control plane data, and ciphering and integrity protection.

A Radio Resource Control (RRC) layer is defined only in the control plane. The RRC layer serves to control the logical channels, the transport channels and the physical channels in association with configuration, reconfiguration and release of radio bearers (RBs). A RB means a logical path provided by a first layer (i.e. PHY layer) and second layers (i.e. MAC layer, RLC layer and PDCP layer) for data transmission between a UE and a network. Configuring the RB includes defining radio protocol layers and characteristics of channels to provide a service and defining specific parameters and operation schemes. The RB may be classified into a signaling RB (SRB) and a data RB (DRB). The SRB is used as the path to transfer RRC messages in the control plane and the DRB is used as the path to transfer user data in the user plane.

If an RRC connection is established between a RRC layer of the UE and a RRC layer of the E-UTRAN, then the UE is in an RRC_CONNECTED state. Otherwise, the UE is in an RRC_IDLE state.

Downlink transport channels for transmitting data from a network to UE may include a Broadcast Channel (BCH) for transmitting system information, and a downlink Shared Channel (SCH) for transmitting other user traffic or control messages. In case of traffic or control messages of a downlink multicast or broadcast service, they may be transmitted either via a downlink SCH, or via a separate downlink Multicast Channel (MCH). On the other hand, uplink transport channels for transmitting data from UE to a network may include a Random Access Channel (RACH) for transmitting an initial control message and an uplink Shared Channel (SCH) for transmitting user traffic or control messages.

Logical channels which are located at an upper level of transport channels and mapped to the transport channels may include a Broadcast Control Channel (BCCH), a Paging Control Channel (PCCH), a Common Control Channel (CCCH), a Multicast Control Channel (MCCH), a Multicast Traffic Channel (MTCH), and the like.

A physical channel includes multiple symbols inn time domain and multiple sub-carriers in frequency domain. A sub-frame includes a plurality of symbols in the time domain. A sub-frame includes a plurality of resource blocks each including a plurality of symbols and a plurality of sub-carriers. Also, each sub-frame can use particular sub-carriers of particular symbols (e.g., a first symbol) in the relevant sub-frame for a Physical Downlink Control Channel (PDCCH), that is, a L1/L2 control channel. A Transmission Time Interval (TTI) as a unit time for transmitting data is 1 ms, corresponding to one sub-frame.

Hereinafter, an RRC state and an RRC connection method of UE will be described in detail.

The RRC state refers to whether or not the RRC layer of the UE is logically connected to the RRC layer of the E-UTRAN. If connected, then it is called an RRC_CONNECTED state, and otherwise it is called an RRC_IDLE state. For the UE in an RRC_CONNECTED state, the E-UTRAN can recognize the existence of the relevant UE in a cell unit because there exist an RRC connection thereof, and thus the E-UTRAN can effectively control the UE. On the contrary, for the UE in RRC_IDLE state, the E-UTRAN cannot recognize the relevant UE, and therefore, it is managed by a core network in a tracking area unit, which is a unit larger than a cell. In other words, the existence of the UE in an RRC_IDLE state is only recognized in a large area unit, and therefore, it should be changed to an RRC_CONNECTED state in order to receive typical mobile communication services such as voice or data.

When the UE is initially turned on by a user, the UE first searches for a suitable cell and then is camped in an RRC_IDLE state in the corresponding cell. The UE camped in an RRC_IDLE state makes an RRC connection with the E-UTRAN through an RRC connection procedure when it is required to make an RRC connection, thereby changing the state to an RRC_CONNECTED state. There are several cases when the UE in the RRC_IDLE state is required to make an RRC connection. For example, an uplink data transmission may be required due to a phone call attempt by the user, or the like, or the transmission of a response message may be required in response to a paging message received from the E-UTRAN.

A Non-Access Stratum (NAS) layer belonging to the upper layer of the RRC layer serves to perform session management and mobility management.

In order to manage the mobility of the UE at the NAS layer, both an EPS Mobility Management-REGISTERED (EMM-REGISTERED) state and an EMM-DEREGISTERED state are defined, and both states will be applied to the UE and the MME. The UE is initially in an EMM-DEREGISTERED state, and carries out a process of registering it into the corresponding network through an 'Initial Attach' procedure in order to access a network. If this 'Attach' procedure has been successfully carried out, then the UE and the MME will be in an EMM-REGISTERED state.

In order to manage a signaling connection between the UE and the EPC, both an EPS Connection Management (ECM)-IDLE state and an ECM-CONNECTED state are defined, and the both states will be applied to the UE and the MME. If the UE in an ECM-IDLE state makes an RRC connection with E-UTRAN, then it will be in an ECM-CONNECTED state. If the MME in an ECM-IDLE state makes an S1 connection with E-UTRAN, then it will be in an ECM-CONNECTED state. When the UE is in an ECM-IDLE state, the E-UTRAN has no context information of the UE. Therefore, the UE in an ECM-IDLE state carries out a UE-based mobility procedure such as a cell selection or cell reselection without receiving a command from the network. On the contrary, when the UE is in an ECM-CONNECTED state, the mobility of the UE is managed by a command of the network. If the location of the UE in an ECM-IDLE state is changed from the location that has been recognized by the network, the UE performs a Tracking Area Update procedure to notify the network of the corresponding location of the UE.

Next, system information will be described.

The system information includes essential information for the UE to know in order to access a base station. Therefore, the UE should have received all of the system information prior to accessing the base station, and also should have the latest system information all the time. Furthermore, the base station periodically transmits the system information because the system information should be notified to every UE in a cell.

In the Section 5.2.2 of the 3GPP TS 36.331 V8.4.0 (2008-12) "Radio Resource Control (RRC); Protocol specification (Release 8)", the system information can be divided into Master Information Block (MIB), Scheduling Block (SB) and System Information Block (SIB). The MIB allows the UE to be notified of a physical architecture of the corresponding cell, for example, a bandwidth, and the like. The SB notifies of the transmission information of SIBs, for example, transmission period, and the like. The SIB is a set of mutually-related system information. For example, a certain SIB includes only the information of neighboring cells, and another certain SIB includes only the information of uplink radio channels used by the UE.

In general, network services provided to UE can be divided into three types as follows. Furthermore, the UE may recognize the type of a cell differently based on which service can be received. First, the type of services will be described, and then the type of a cell will be described below.

1) Limited service: This service provides an emergency call and an earthquake and tsunami warning system (ETWS), and may be provided in an acceptable cell.

2) Normal service: This service denotes a public use with general purposes, and may be provided in a suitable or normal cell.

3) Operator service: This service denotes a service for communication network service providers, and this cell can be only used by communication network service providers but cannot be used by typical users.

With regard to the service types provided by a cell, the type of a cell can be divided as follows.

1) Acceptable cell: A cell in which the UE can receive a limited service. This cell is not barred and satisfies the cell selection criteria of the UE from a standpoint of the corresponding UE.

2) Suitable cell: A cell in which the UE can receive a normal service. This cell satisfies the condition of an acceptable cell, and at the same time satisfies additional conditions. For additional conditions, the cell should be attached to PLMN to which the corresponding UE can be accessed, and it should be a cell in which the implementation of a tracking area update procedure by the UE is not barred. If the relevant (or corresponding) cell is a CSG cell, then it should be a cell that can be accessed by the UE as a CSG member.

3) Barred cell: A cell broadcasting information that it is a barred cell through the system information.

4) Reserved cell: A cell broadcasting that it is a reserved cell through the system information.

Hereinafter, Closed Subscriber Group (CSG) will be described.

A base station which provides CSG service is called a Home Node B (HNB) or Home eNB (HeNB) in 3GPP. Hereinafter, both the HNB and HeNB are commonly designated as a HNB. An object of the HNB is basically to provide specialized services only to a member of the CSG However, those services may be provided to other users in addition to the CSG depending on the operation mode setting of the HNB.

Figure 4:
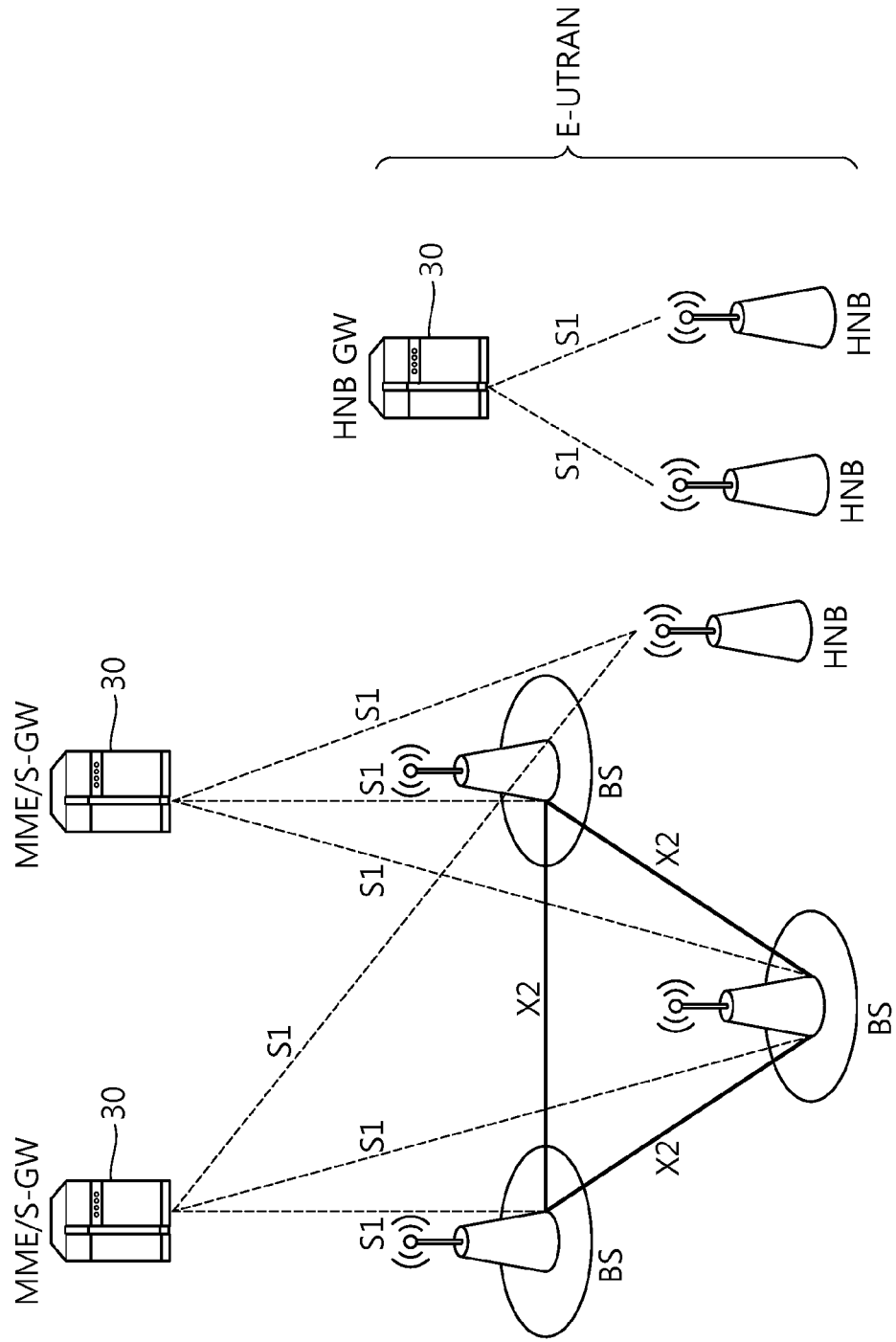
FIG. 4 is an exemplary view illustrating a network architecture for managing an HNB by using an HNB gateway.

FIG. 4 is an exemplary view illustrating a network architecture for managing an HNB by using an HNB gateway (GW).

HNBs may be connected to EPC via HNB GW or directly connected to EPC. Here, the HNB GW is regarded as a typical BS to MME. Also, the HNB GW is regarded as the MME to the HNB. Therefore, an S1 interface is connected between HNB and HNB GW, and also an S1 interface is connected between the HNB GW and the EPC. Furthermore, even in case of directly connecting between HNB and EPC, it is connected via an S1 interface. The function of HNB is almost similar to the function of a typical BS.

In general, HNB has a low radio transmission output power compared to the BS owned by mobile communication service providers. Therefore, the service coverage provided by HNB is typically smaller than the service coverage provided by (e)NB. Due to such characteristics, the cell provided by HNB is classified as a femto cell in contrast to a macro cell provided by (e)NB from a standpoint of the service coverage.

From a standpoint of provided services, when HNB provides those services only to a CSG group, the cell provided by this HNB is referred to as a CSG cell.

Each CSG has its own identifier which is called a CSG ID (CSG identity). The UE may have a CSG list to which the UE itself belongs as a member thereof, and this CSG list may be changed by a request of the UE or a command of the network. In the current specification of the 3GPP, one HNB may support one CSG.

A UE has a list of CSGs to which the UE belongs as a member. This list is called as a CSG white list.

HNB delivers the CSG ID of the CSG being supported by itself through the system information, thereby allowing only the corresponding CSG member UE to be accessed. When a CSG cell is found by the UE, what CSG being supported by this CSG cell can be checked by reading the CSG ID included in the system information. The UE that has read the CSG ID regards the corresponding cell as an accessible cell only if the UE itself is a member of the corresponding CSG cell or the CSG corresponding to the CSG ID is included in the UE's CSG white list.

It is not always required for HNB to allow only the CSG UE to be accessed. Based on the configuration setting of HNB, non-CSG member UE may be allowed to be accessed. The type of UE allowed to be accessed may be changed based on the configuration setting of HNB. Here, the configuration setting denotes the setting of the access mode (or may be called as operation mode) of HNB. The access mode of HNB can be divided into three types as follows based on the type of UE.

1) Closed access mode: A mode in which services are provided to particular CSG members only. A CSG cell is provided by the HNB.

2) Open access mode: A mode in which services are provided without any restriction of particular CSG members like typical (e)NB. The HNB provides a typical cell not a CSG cell. For clarity, a macro cell is a cell operated by the open access mode.

3) Hybrid access mode: A mode in which CSG services are provided to particular CSG members and also services are provided to non-CSG members like a typical cell. It is recognized as a CSG cell for the CSG member UE, and recognized as a typical cell for the non-CSG member UE. This cell is called a hybrid cell.

HNB notifies the UE that the cell being serviced by itself is a CSG cell or typical cell, allowing the UE to know whether or not it can be accessed to the corresponding cell. HNB being managed in a closed access mode broadcasts via the system information that it is a CSG cell. In this manner, HNB allows the system information to include a CSG indicator indicating whether or not the cell being serviced by itself is a CSG cell in the system information.

For example, the CSG cell broadcasts by setting the CSG indicator to 'TRUE'. If the cell being serviced is not a CSG cell, then it may be used a method that the CSG indicator may be set to 'FALSE' or the transmission of the CSG indicator is omitted. The UE should distinguish a typical cell from a CSG cell, and thus a typical BS may also transmit the CSG indicator (for example, the CSG indicator set to 'FALSE'), thereby allowing the UE to know that the cell type provided by itself is a typical cell. Furthermore, the typical BS may not transmit the CSG indicator, thereby allowing the UE to know that the cell type provided by itself is a typical cell, too.

The CSG-related parameters transmitted by the corresponding cell for each cell type are represented in Table 1. The CSG-related parameters may be transmitted via system information.

TABLE 1

|  | CSG Cell | Typical Cell |
|---|---|---|
| CSG Indicator | 'CSG Cell' is indicated | 'Non-CSG cell' is indicated, or not transmitted |
| CSG ID | Supported CSG ID is transmitted | Not transmitted |

The types of UE allowed to be accessed for each cell type are represented in Table 2.

TABLE 2

|  | CSG Cell | Typical Cell |
|---|---|---|
| UE not supporting CSG | Access denied | Access accepted |
| Non-CSG member UE | Access denied | Access accepted |
| CSG member UE | Access accepted | Access accepted |

Figure 5:
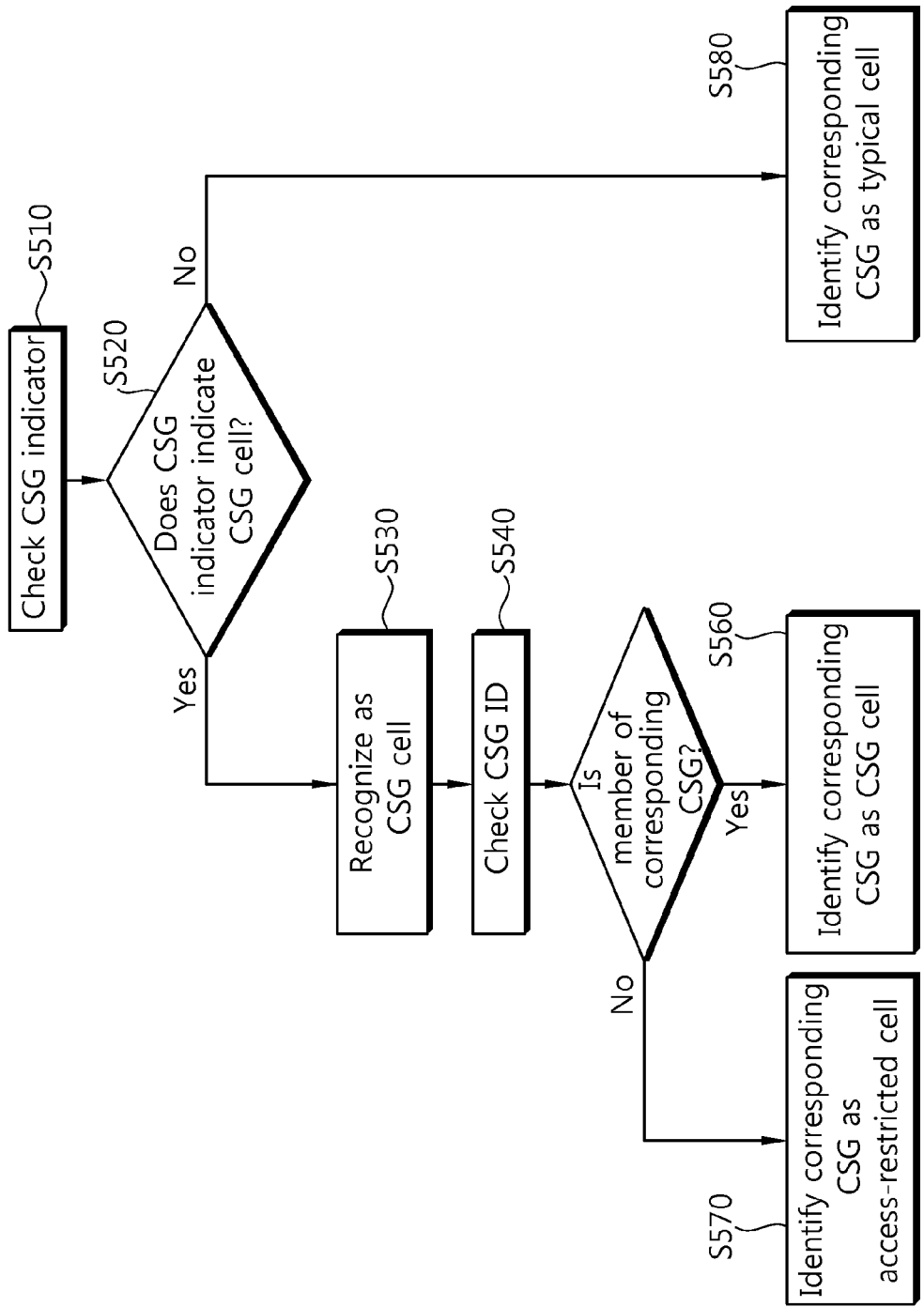
FIG. 5 is a flowchart illustrating a method of checking the access mode of a base station by the UE.

FIG. 5 is a flowchart illustrating a method of checking the access mode of a base station by the UE.

A UE checks a CSG indicator in system information of a target cell in order to confirm what is the type of the target cell (S510).

After checking the CSG indicator, if the CSG indicator indicates that the target cell is a CSG cell, then the UE recognizes the corresponding cell as the CSG cell (S520, S530). The UE checks the CSG ID in the system information in order to check whether or not the UE itself is a CSG member of the target cell (S540).

If it is checked from the CSG ID that the UE is a CSG member of the target cell, then the corresponding cell will be recognized as an accessible CSG cell (S550, S560). If it is checked from the CSG ID that the UE is not a CSG member of the target cell, then the corresponding cell will be recognized as an inaccessible CSG cell (S550, S570).

If the CSG indicator indicates that the target cell is not a CSG cell, then the UE recognizes the target cell as a typical cell (S520, S580). Furthermore, if the CSG indicator is not transmitted in the step S510, the UE recognizes the object cell as a typical cell.

In general, CSG cells and macro cells may be concurrently managed in a particular frequency. A CSG dedicated frequency is a frequency in which CSG cells exist only. A mixed carrier frequency is a frequency in which CSG cells and macro cells exist. The network may reserve a physical layer cell identifier for the CSG cell in a mixed carrier frequency. The physical layer cell identifier is called a Physical Cell Identity (PCI) in E-UTRAN, and called a Physical Scrambling Code (PSC) in UTRAN. For clarity, the physical layer cell identifier will be expressed by PCI.

The CSG cell notifies information on the PCI reserved for CSG cell at a current frequency via the system information. The UE received this information can determine whether or not this cell is a CSG cell from the PCI of the cell when a certain cell is found at the corresponding frequency. How this information being used by the UE will be illustrated below in case of two types of UE.

First, in case of the UE, not supporting the CSG-related function or having no CSG list to which the UE itself belongs, the UE does not need to regard a CSG cell as a selectable cell during the cell selection/reselection process or handover. In this case, the UE checks only the PCI of the cell, and then the UE may immediately eliminate the corresponding cell during the cell selection/reselection process or handover if the PCI is a reserved PCI for CSG. Typically, the PCI of a certain cell may be immediately known during a process of checking the existence of the corresponding cell in a physical layer by the UE.

Second, in case of the UE having a CSG list to which the UE itself belongs, when the UE wants to know a list of the neighboring CSG cells at a mixed carrier frequency it may be known that the corresponding cell is a CSG cell if only a cell having the PCI reserved for CSG is found, instead of individually checking the CSG identity of the system information of every cell found in the whole PCI range.

If a BS is capable of determine an access mode or handover based on CSG subscription information, the BS may be able to provide better quality services to more UE. More specifically, it is assumed that the BS is operating in an open access mode and is capable of identifying a number of UE currently being connected thereto as members of a predetermined CSG, e.g., CSG_A. The BS may switch its access mode to a hybrid mode for supporting CSG_A, and may provide high-quality CSG services to the members of CSG_A while providing ordinary services to other non-CSG members.

If a BS is capable of choosing a CSG to support based on CSG subscription information of UE, the BS may also be able to provide better quality services to more UE. It is assumed that a BS is operating in a hybrid mode for supporting CSG_A in order to service the members of CSG_A and other non-CSG members. If the BS can know that a number of UE currently being connected thereto support CSG_B, instead of CSG_A, the BS may consider switching from the hybrid mode for supporting CSG_A to a hybrid mode for supporting CSG_B.

If a BS can acquire CSG subscription information of the UE for another BS, the BS may be able to decide whether to handover the UE to a target BS based on the CSG subscription information. If a BS is provided with a CSG ID of the target BS and CSG membership information indicating whether UE is CSG member UE of the target BS, the BS may determine whether the UE can access the target BS based on the CSG membership information and the CSG ID of the target BS. This information may be applied as a decision factor to determine whether to handover the UE to the target BS.

CSG UE indicates a UE which subscribes at least one CSG, and includes not only CSG member UE but also non-CSG member UE of any given cell.

CSG subscription information may include a CSG whitelist present in UE, a CSG ID of a BS and/or CSG membership information indicating whether the UE is CSG member UE of the BS.

The CSG subscription information may include CSG subscription information for a serving BS which provides services to the UE currently and/or CSG subscription information for another BS which does not provides services to the UE currently. If the CSG subscription information includes CSG subscription information for another BS, the serving BS may send a request for the transfer of CSG subscription information for aonther BS to the UE. Or, the serving BS may send a request for the transfer of CSG subscription information for a BS which has highest signal quality.

CSG subscription information may be provided to a BS in various manners. For example, UE may periodically or non-periodically transmit an uplink message including CSG subscription information to the BS. Alternatively, a UE may transmit CSG subscription information to a BS upon the request of the BS.

A UE may transmit UE capability information and CSG subscription information to a BS when establishing a radio resource control (RRC) connection to the BS.

When there is any changes in the content of a CSG whitelist, UE may transmit the updated CSG whitelist to a BS.

A BS may request for the transfer of CSG subscription information to a UE by transmitting a broadcast signal (such as system information) including a CSG transfer request indicator. If the CSG transfer request indicator is set to 'TRUE,' the UE may provide the CSG subscription information to the BS. On the other hand, if the CSG transfer request indicator is set to 'FALSE' or does not exist in the broadcast signal, the UE may not provide the CSG subscription information to the BS.

Alternatively, the BS may transmit the CSG transfer request indicator to the UE via dedicated signaling.

A BS may utilize CSG subscription information provided by a UE to optimize its CSG-related operations. For example, a BS may use the CSG subscription information to select one of an open access mode, a closed access mode and a hybrid mode as its access mode. Alternatively, a BS may utilize CSG subscription information for another BS from a UE to determine whether the UE may handover to a CSG cell to which the UE belongs, thereby guaranteeing quality of service and the mobility of the UE.

Figure 6:
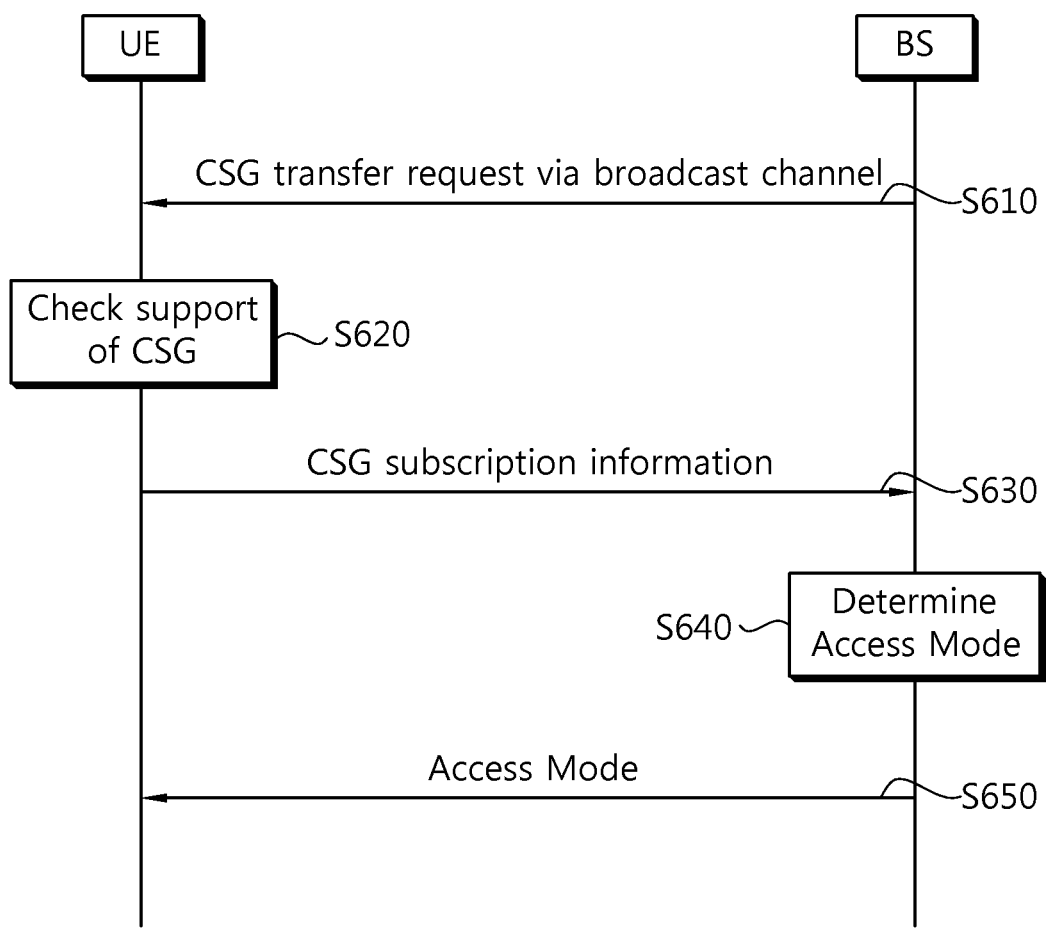
FIG. 6 illustrates a flowchart of a method of supporting a CSG service according to an exemplary embodiment of the present invention.

FIG. 6 illustrates a flowchart of a method of supporting a CSG service according to an exemplary embodiment of the present invention.

A BS may transmit a request for the transfer of CSG subscription information to UE via a broadcast channel (S610). The request for the transfer of CSG subscription information may be transmitted to the UE as part of system information.

If the BS wants to receive a CSG whitelist from the UE, the request for the transfer of CSG subscription information may be included in the system information as a 1-bit CSG transfer request indicator. If the CSG transfer request indicator is set to 'TRUE,' the UE may provide its CSG whitelist to the BS. On the other hand, if the CSG transfer request indicator is set to 'FALSE' or does not exist, the UE may not provide its CSG whitelist to the BS.

Thereafter, if the BS issues a CSG whitelist transfer request to the UE, the UE may identify its CSG whitelist, i.e., a list of CSGs where the UE belongs (S620).

Thereafter, if the CSG whitelist of the UE is empty, the UE may identify itself as non-CSG UE and may not respond to the CSG transfer request issued by the BS. That is, if the UE is non-CSG UE, the UE may not respond to any CSG transfer request broadcast by the BS.

If the CSG whitelist of the UE is not empty, the UE may transmit CSG subscription information which includes the CSG whitelist to the BS (S630).

The BS may receive a CSG whitelist from each UE in its cell, and may then determine its access mode based on the received CSG whitelist(s) (S640). The BS may select one of a closed access mode, an open access mode and a hybrid mode as its access mode.

The BS may send the determined access mode to UEs (S650). The determined access mode may be expressed as a combination of CSG-related parameters included in the system information, for example, a combination of a CSG indicator and a CSG ID (S650).

Then, UE may negotiate with the BS on CSG services that can be provided for a CSG supported by the access mode.

Table 3 shows an example of configuration of CSG-related parameters to indicate the access mode.

TABLE 3

|  | Closed Access Mode | Open Access Mode | Hybrid Mode |
| --- | --- | --- | --- |
| CSG Indicator | 'CSG Cell' is indicated | 'Non-CSG cell' is indicated, or not transmitted | 'Non-CSG cell' is indicated, or not transmitted |
| CSG ID | An identifier of the supported CSG is transmitted | Not transmitted | An identifier of the supported CSG is transmitted |

Referring to Table 3, the expression 'not transmitted' means transmitting no value at all, or transmitting a NULL value or an unreserved arbitrary value.

Figure 7:
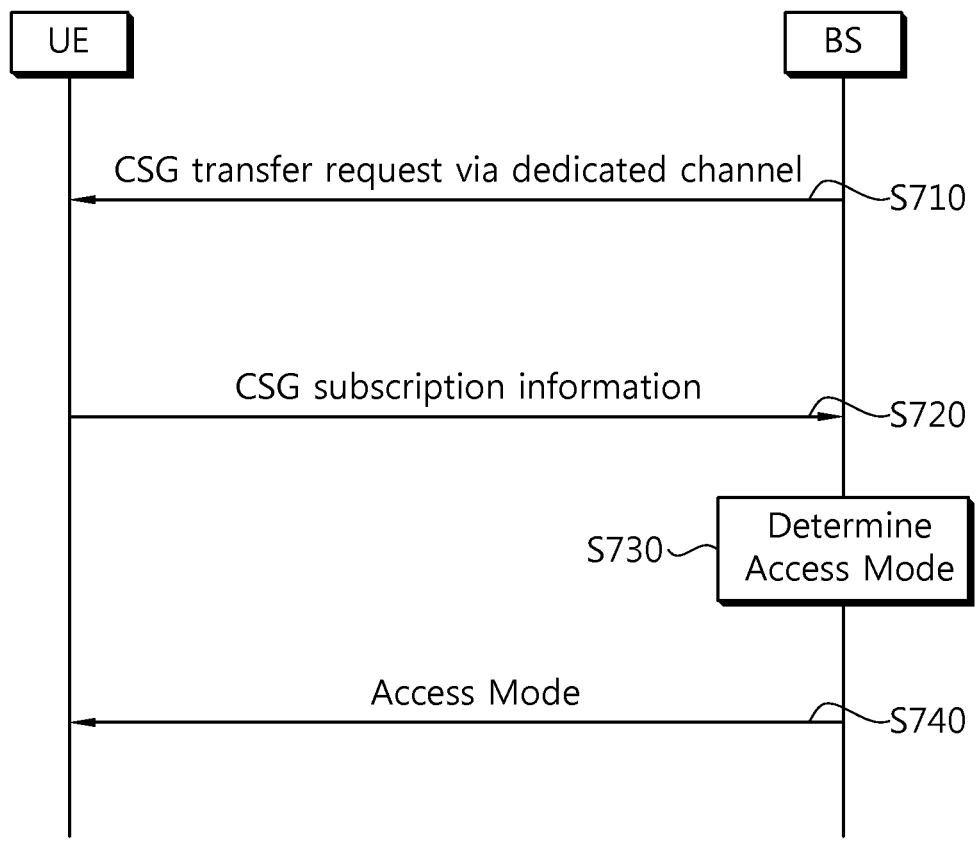
FIG. 7 illustrates a flowchart of a method of supporting a CSG service according to another exemplary embodiment of the present invention.

FIG. 7 illustrates a flowchart of a method of supporting a CSG service according to another exemplary embodiment of the present invention.

A BS may transmit a request for the transfer of CSG subscription information to UE via a dedicated channel (S710). In the exemplary embodiment of FIG. 7, unlike in the exemplary embodiment of FIG. 6, the request for the transfer of CSG subscription information may be transmitted only to a specific UE via a dedicated channel, instead of being broadcast to all UE.

If the BS issues a request of a CSG whitelist by using a CSG subscription information transfer request message, the UE may transmit, to the BS, CSG subscription information which includes the CSG whitelist (S730). Although the CSG whitelist of the UE is empty, the UE may transmit the CSG whitelist which has NULL information.

The BS may receive a CSG whitelist from each UE in its cell, and may then determine its access mode based on the received CSG whitelist(s) (S740). More specifically, the BS may choose one of a closed access mode, an open access mode and a hybrid mode as its access mode.

The BS may send the determined access mode to UEs currently being connected thereto (S750).

In the exemplary embodiments of FIGS. 6 and 7, the UE transmits the CSG subscription information upon the request of the BS. However, the present invention is not restricted to this. The UE may transmit the CSG subscription information to the BS without the request of the BS. For example, there is an update in the content of the CSG whitelist.

Figure 8:
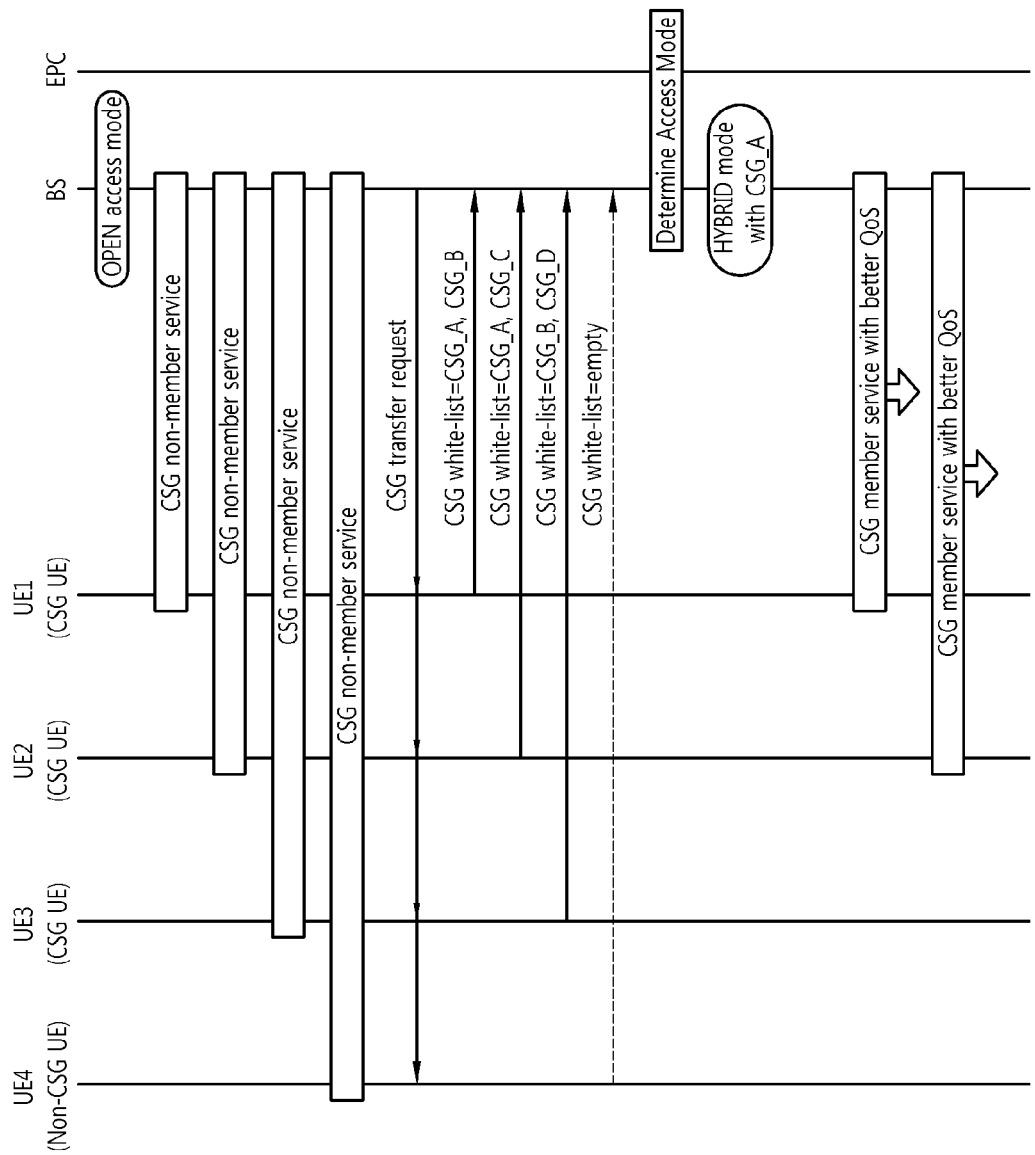
FIG. 8 illustrates an operation according to an exemplary embodiment of the present invention.

FIG. 8 illustrates an operation according to an exemplary embodiment of the present invention.

Initially, a BS operates in an open access mode and multiple UE, i.e., UE1 through UE4, are provided with non-CSG services.

Each of a UE1, a UE2, a UE3 and a UE4 transmits a CSG whitelist to the BS in response to a CSG transfer request transmitted by the BS. The UE1 may transmit a CSG whitelist including CSG_A and CSG_B to the BS, the UE2 may transmit a CSG whitelist including CSG_A and CSG_C, the UE3 may transmit a CSG whitelist including CSG_B and CSG_D, and the UE4 may transmit an empty CSG whitelist to the BS. Since the UE4 is a non-CSG UE, the UE4 may not transmit any CSG whitelist to the BS.

The BS may determine its access mode based on the CSG whitelists provided by UE1 through UE4. Since UE1 and UE2 are members of CSG_A, the BS may switch from the open access mode to a hybrid mode for supporting CSG_A. Therefore, UE1 and UE2 can be provided with high-quality CSG services after negotiation with the BS, whereas UE3 and UE4 may be provided with ordinary services.

Figure 9:
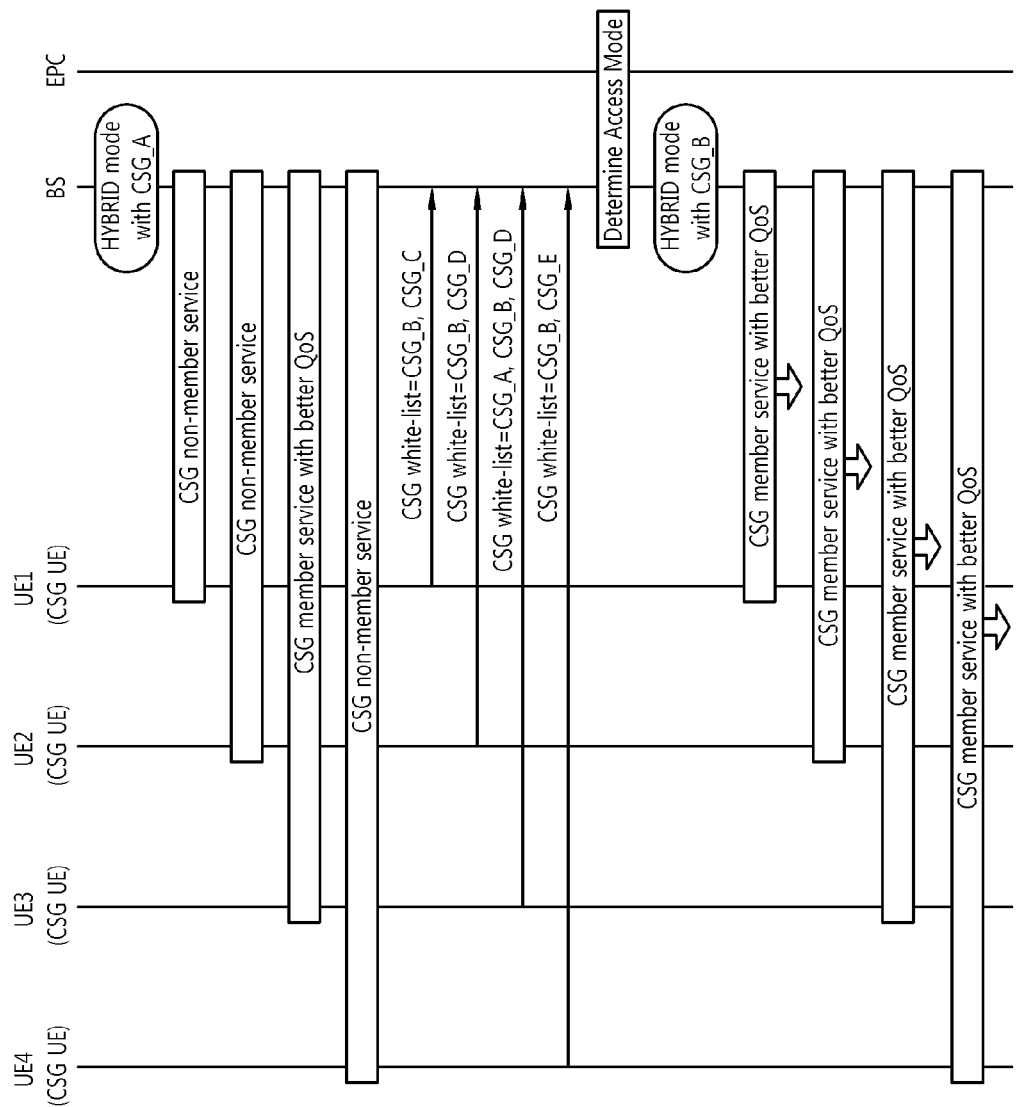
FIG. 9 illustrates an operation according to an exemplary embodiment of the present invention.

FIG. 9 illustrates an operation according to an exemplary embodiment of the present invention.

Initially, a BS operates in a hybrid mode for supporting CSG_A. A UE3, which is a member of CSG_A, is provided with CSG member services, and a UE1, a UE2 and a UE4, which are not members of CSG_A, are provided with non-CSG member services.

Each of the UE1 through UE4 may transmit a CSG whitelists to the BS in response to or regardless of a CSG transfer request transmitted by the BS. The UE1 may transmit a CSG whitelist including CSG_B and CSG_C to the BS, the UE2 may transmit a CSG whitelist including CSG_B and CSG_D to the BS, the UE3 may transmit a CSG whitelist including CSG_A, CSG_B, and CSG_D to the BS, and the UE4 may transmit a CSG whitelist including CSG_B and CSG_E to the BS.

The BS may determine its access mode based on the CSG whitelists provided by UE1 through UE4. The BS may confirm that UE1 through UE4 are all members of CSG_B based on the CSG whitelists provided by UE1 through UE4, and may then decide to switch from the hybrid mode for supporting CSG_A to the hybrid mode for supporting CSG_B in order to provide better quality services to UEs. In order to switch to the hybrid mode for supporting CSG_B, the BS may perform a predetermined procedure along with an evolved packet core (EPC).

In addition, in order to provide better quality CSG member services to UE1, UE2 and UE4, the BS may enter into CSG service negotiations, i.e., Quality-of-Service (QoS) negotiations, with the EPC.

Once the switching of the access mode of the BS and the QoS negotiations between the BS and the EPC are complete, UE1, UE2 and UE4 can be provided with high-quality CSG services that they deserve as members of CSG_B by the BS.

Figure 10:
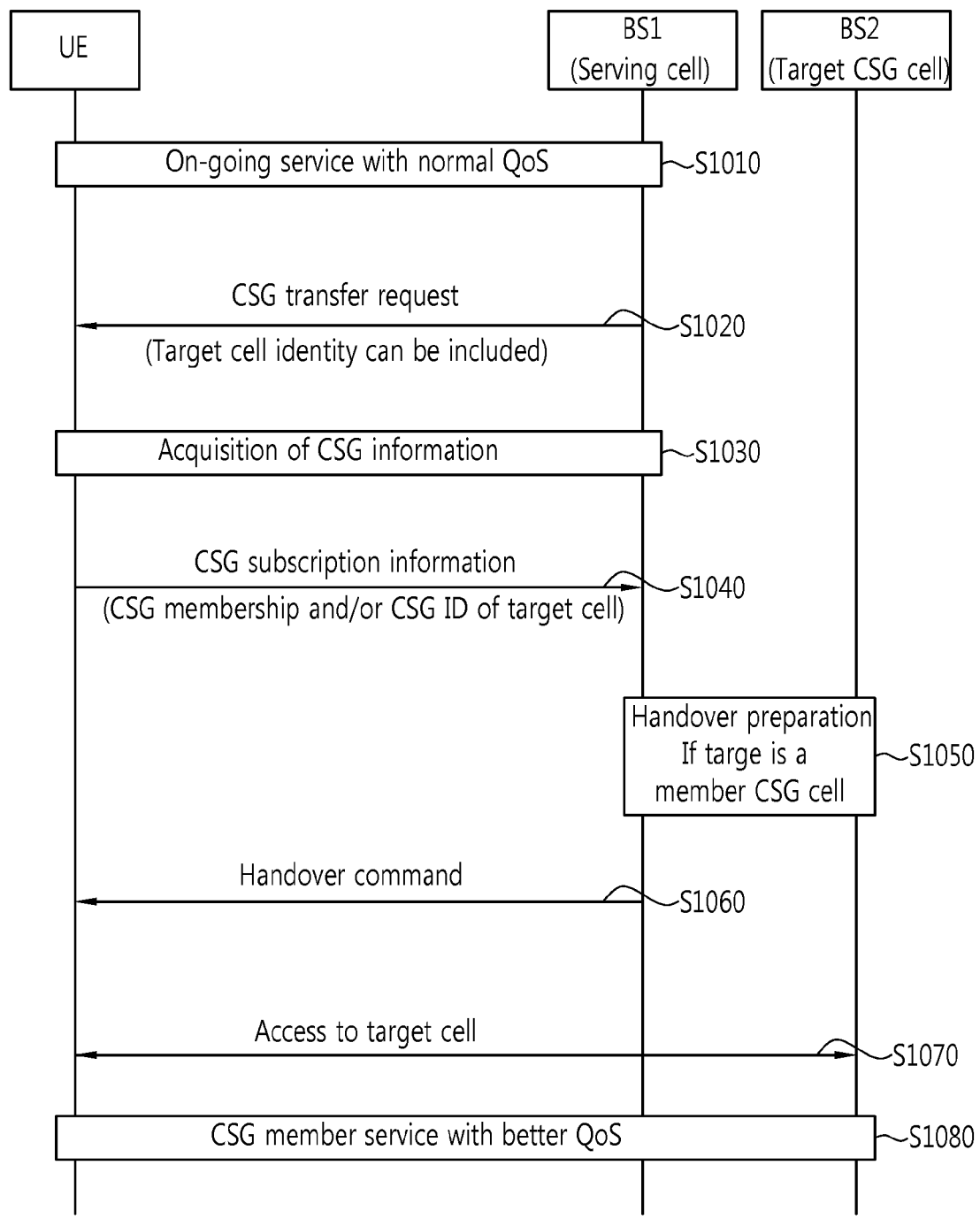
FIG. 10 illustrates an operation according to an exemplary embodiment of the present invention.

FIG. 10 illustrates an operation according to an exemplary embodiment of the present invention.

A UE may be serviced a first BS BS1 as its serving cell (S1010).

The first BS may transmit a request for the transfer of CSG subscription information of a second BS BS2 to the UE (S1010). The first BS may choose the second BS as a target BS and may send a request for the transfer of CSG subscription information of the target BS. For this, the identity of the second BS may be included in the CSG transfer request.

Alternatively, the CSG transfer request may indicate that the UE selects the target BS and the UE sends CSG subscription information of the selected target BS.

The UE may acquire the CSG subscription requested by the first BS (S1030). The UE may acquire the CSG subscription information via signaling with the second BS or using various methods.

The UE may transmit the acquired CSG subscription information to the first BS (S1040). The CSG subscription information of the second BS may include a CSG ID of the second BS and/or CSG membership information indicating whether the UE is CSG member UE of the second BS.

The first BS can determine whether the UE is a CSG member UE of the second BS based on the CSG subscription information.

If the second BS is a member CSG cell of the UE, the first BS may prepare for a handover of the UE to the second BS (S1050).

The first BS may transmits a handover command to the UE (S1060). The handover command may include a target cell identity win a configuration to be used in the target cell.

The UE which receives the handover command may access to the second BS (S1070). Thereafter, the UE may be provided with CSG services by the second BS through negotiation with the second BS (S1080).

If a UE is a CSG member UE of a target BS, a serving BS may handover the UE to the target BS. Thus the US can be provided with better quality CSG services.

A BS may determine its access mode based on CSG subscription information provided by a UE. For example, if a number of UE currently being connected to the BS are members of a predetermined CSG, the BS may decide to switch its access mode from, for example, an open access mode, to a hybrid mode for supporting the predetermined CSG and may thus be able to provide high-quality CSG services to the members of the predetermined CSG.

The BS may determine the access mode or handover based on CSG subscription information provided by a UE. Thus, it is possible for UE to have more opportunities to access to a BS capable of providing CSG services and to be provided with better CSG services.

Figure 11:
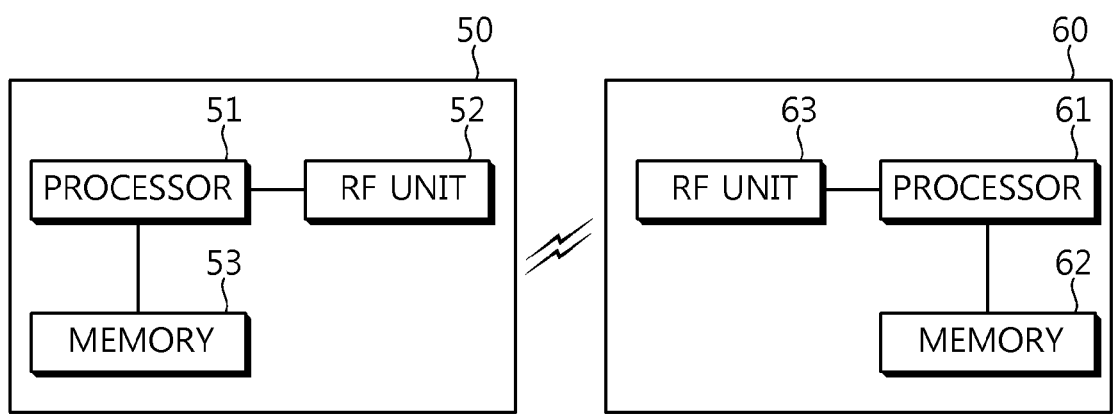
FIG. 11 is a block diagram showing wireless communication system to implement an embodiment of the present invention.

FIG. 11 is a block diagram showing wireless communication system to implement an embodiment of the present invention. ABS 50 may include a processor 51, a memory 52 and a radio frequency (RF) unit 53. The memory 52 is operatively coupled with the processor 51 and stores a variety of information to operate the processor 51. The RF unit 53 is operatively coupled with the processor 11, and transmits and/or receives a radio signal.

The processor 51 may be configured to implement proposed functions, procedures and/or methods described in this description. Layers of the radio interface protocol may be implemented in the processor 51. The processor 51 may receive CSG subscription information from a UE 60 in a cell and may determine an access mode or handover based on the at least one CSG white list. The processor 51 may transmit the determined access mode to the UE 60 via system information.

A UE 60 may include a processor 61, a memory 62 and a RF unit 63. The memory 62 is operatively coupled with the processor 61 and stores a variety of information to operate the processor 61 and CSG subscription information. The RF unit 63 is operatively coupled with the processor 61, and transmits and/or receives a radio signal.

The processor 61 may be configured to implement proposed functions, procedures and/or methods described in this description. The processor 61 may access to the BS 50 and may send the CSG subscription information of the BS 50 or the subscription information of another BS.

The processors 51, 61 may include application-specific integrated circuit (ASIC), other chipset, logic circuit and/or data processing device. The memories 52, 62 may include read-only memory (ROM), random access memory (RAM), flash memory, memory card, storage medium and/or other storage device. The RF units 53, 63 may include baseband circuitry to process radio frequency signals. When the embodiments are implemented in software, the techniques described herein can be implemented with modules (e.g., procedures, functions, and so on) that perform the functions described herein. The modules can be stored in memories 52, 62 and executed by processors 51, 61. The memories 52, 62 can be implemented within the processors 51, 61 or external to the processors 51, 61 in which case those can be communicatively coupled to the processors 51, 61 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible.

Accordingly, the subject specification is intended to embrace all such alternations, modifications and variations that fall within the spirit and scope of the appended claims.

What is claimed is:

1. A method of supporting a closed subscriber group (CSG) service in a wireless communication system, the method performed by a user equipment and comprising:

receiving a request from a serving cell for CSG subscription of a neighbor cell;

receiving system information broadcast by the neighbor cell, the system information including a CSG identity of the neighbor cell; and transmitting CSG subscription information to the serving cell, the CSG subscription information including the CSG identity of the neighbor cell and a CSG membership indicator indicating whether the user equipment is a member of a CSG of the neighbor cell.

2. The method of claim 1, further comprising:

receiving a physical cell identity of the neighbor cell, wherein the physical cell identity is used to identify the neighbor cell.

3. The method of claim 1, further comprising:

receiving a handover command indicating a handover from the serving cell to the neighbor cell.

4. The method of claim 1, wherein the CSG membership indicator is not included in the CSG subscription information if the CSG identity is not included in a user equipment CSG whitelist.

5. A user equipment for supporting a closed subscriber group (CSG) service in a wireless communication system, the user equipment comprising:
- a memory configured to store a user equipment CSG whitelist; and
- a processor operatively coupled to the memory and configured to:
  - receive a request from a serving cell for CSG subscription of a neighbor cell;
  - receive system information broadcast by the neighbor cell, the system information including a CSG identity of the neighbor cell and
  - transmit CSG subscription information to the serving cell, the CSG subscription information including the CSG identity of the neighbor cell and a CSG membership indicator indicating whether the user equipment is a member of a CSG of the neighbor cell.

6. The user equipment of claim 5, wherein the processor is further configured to receive a physical cell identity of the neighbor cell, wherein the physical cell identity is used to identify the neighbor cell.

7. The user equipment of claim 5, wherein the processor is further configured to receive a handover command indicating a handover from the serving cell to the neighbor cell.

8. The user equipment of claim 5, wherein the CSG membership indicator is not included in the CSG subscription information if the CSG identity is not included in the user equipment CSG whitelist.

* * * * *